(12) United States Patent
Mitra et al.

(10) Patent No.: US 12,627,606 B2
(45) Date of Patent: May 12, 2026

(54) LOW COMPLEXITY CELLULAR TRAFFIC PREDICTION

(71) Applicant: Dell Products L.P., Round Rock, TX (US)

(72) Inventors: Jeebak Mitra, Ottawa (CA); Nour Mohamed Hussein Kamaly, Heliopolis (EG)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 18/656,200

(22) Filed: May 6, 2024

(65) Prior Publication Data

US 2025/0343761 A1     Nov. 6, 2025

(51) Int. Cl.
H04L 47/127      (2022.01)
H04W 28/02      (2009.01)

(52) U.S. Cl.
CPC ....... H04L 47/127 (2013.01); H04W 28/0289 (2013.01)

(58) Field of Classification Search
CPC ....... H04W 4/029; H04W 24/02; H04W 4/80; H04W 24/08; H04W 4/38; H04W 24/04; H04W 84/042; H04W 4/08; H04W 8/186; H04W 12/068; H04W 12/68; H04W 4/70; H04W 40/02; H04W 64/003; H04W 8/005; H04W 84/12; H04W 84/22; H04W 64/00; H04W 88/005; H04W 24/00; H04W 64/006; H04W 4/025; H04W 88/08;

(Continued)

(56) References Cited

U.S. PATENT DOCUMENTS

2022/0321408 A1*   10/2022   Mahimkar  .......... H04L 41/0886
2023/0068437 A1*   3/2023   Narayanan  ........... H04W 24/02
(Continued)

OTHER PUBLICATIONS

Wallentinsson, E. W. (2019). Multiple Time Series Forecasting of Cellular Network Traffic (Dissertation). Retrieved from https://urn.kb.se/resolve?urn=urn:nbn:se:liu:diva-154868 (Year: 2019).*
(Continued)

*Primary Examiner* — Djenane M Bayard
(74) *Attorney, Agent, or Firm* — Amin, Turocy & Watson, LLP

(57)        ABSTRACT

The technology described herein is directed towards accurate low-complexity decision tree-based traffic predictor models, such as decision tree regressor models for use by base stations. Each model is rapidly retrained per base station using data relevant to the base station. To improve accuracy, statistically significant feature data is selected by performing hypothesis testing on candidate features to filter out features that cannot satisfy a statistical significance threshold (e.g., p-value). The decision tree regressor model is recursively grown based on the selected features' feature values and their traffic level labels. Predicted traffic level data is determined by traversing the trained decision tree to reach a leaf node associated with the prediction data. Resource allocation can be based on the prediction. In addition to time-series training data, spatial training data can be used. Real time traffic monitoring by a radio unit for operating in an autonomous management mode is also facilitated.

20 Claims, 15 Drawing Sheets

(58) Field of Classification Search
CPC ....... H04W 4/02; H04W 24/10; H04W 16/18;
H04W 4/024; H04W 4/021; H04W 76/20;
H04W 84/04; H04W 16/14; G06N 20/00;
G06N 3/08; G06N 7/01; G06N 5/01;
G06N 20/20; G06N 20/10; G06N 3/04;
G06N 3/044; G06N 3/045; G06N 3/084;
G06N 10/00; G06N 3/00; G06N 3/12;
G06N 3/0442; G06N 3/0455; G06N
3/0464; G06N 3/0475; G06N 3/094;
G06N 5/02; G06N 5/025; G06N 5/04;
G06N 5/045; G06N 5/048; G06N 7/00;
H04L 41/0809; H04L 41/0886; H04L
9/50; H04L 41/0627; H04L 41/0816;
H04L 41/0859; H04L 41/0869; H04L
41/145; H04L 41/40; H04L 41/5009;
H04L 43/0817; H04L 43/0852; H04L
43/0888; H04L 43/16; H04L 2209/56;
H04L 67/125; H04L 67/34; H04L 67/535;
H04L 43/50; H04L 43/55; H04L 41/00;
H04L 41/142; H04L 41/344; H04L
41/5003; H04L 41/5022; H04L 41/5087;
H04L 41/509; H04L 43/02; H04L 41/16;
H04L 41/0631; H04L 41/0893; H04L
41/0894; H04L 41/0895; H04L 41/14;
H04L 41/147; H04L 43/0823
See application file for complete search history.

(56) References Cited

U.S. PATENT DOCUMENTS

2023/0102489 A1* 3/2023 Hu ........................ H04W 28/08
370/329

2025/0102656 A1* 3/2025 Mamandipoor ........ G01S 13/04

OTHER PUBLICATIONS

Siami-Namini, Sima, Neda Tavakoli, and Akbar Siami Namin. "A Comparison of ARIMA and LSTM in Forecasting Time Series", 17th IEEE International Conference on Machine Learning and Applications, 2018, 8 pages.

X. Wang et al., "Spatio-Temporal Analysis and Prediction of Cellular Traffic in Metropolis", IEEE Trans. Mob. Comput., vol. 18, No. 9, 2019, 14 pages.

T. Chen, Y. Yang, H. Zhang, H. Kim, and K. Horneman, "Network energy saving technologies for green wireless access networks", IEEE Wireless Commun., vol. 18, No. 5, Oct. 2011. 9 pages.

S. McLaughlin, P. M. Grant, J. S. Thompson, H. Haas, D. I. Laurenson, C. Khirallah, Y. Hou, and R. Wang, "Techniques for improving cellular radio base station energy efficiency", IEEE Wireless Commun., vol. 18, No. 5, Oct. 2011. 8 pages.

O-RAN Work Group 1 (Use Cases and Overall Architecture). "Network Energy Saving Use Cases Technical Report", O-RAN. WG1.NESUC-R003-v02.00, 2023, 105 pages.

G. N. Katsaros, R. Tafazolli and K. Nikitopoulos, "On the Power Consumption of Massive-MIMO, 5G New Radio with Software-Based PHY Processing," 2022 IEEE Globecom Workshops (GC Wkshps), Rio de Janeiro, Brazil, 2022, pp. 765-770.

N. P. Le, F. Safaei and L. C. Tran, "Antenna Selection Strategies for MIMO-OFDM Wireless Systems: An Energy Efficiency Perspective," in IEEE Transactions on Vehicular Technology, vol. 65, No. 4, pp. 2048-2062, Apr. 2016.

C. Han et al. "Green radio: Radio techniques to enable energy-efficient wireless networks", IEEE Commun. Mag., vol. 49, No. 6, May 2011. 9 pages.

Mitra, et al. "Enhanced Radio Frequency Channel Reconfiguration" U.S. Appl. No. 18/677,603, filed May 29, 2024, 121 pages.

* cited by examiner

402 — Deploy Decision Tree Regressor Model

404 — Independent Data Point (Feature Group for Unknown Traffic Level Data Value to be Predicted)

406 — Traverse Decision Tree Regressor Model

408 — Obtain Predicted Traffic Level Value(s) from Matching Leaf Node that is Reached 410 — If Multiple Prediction Values, Combine Predicted Values to Obtain Predicted Traffic Load

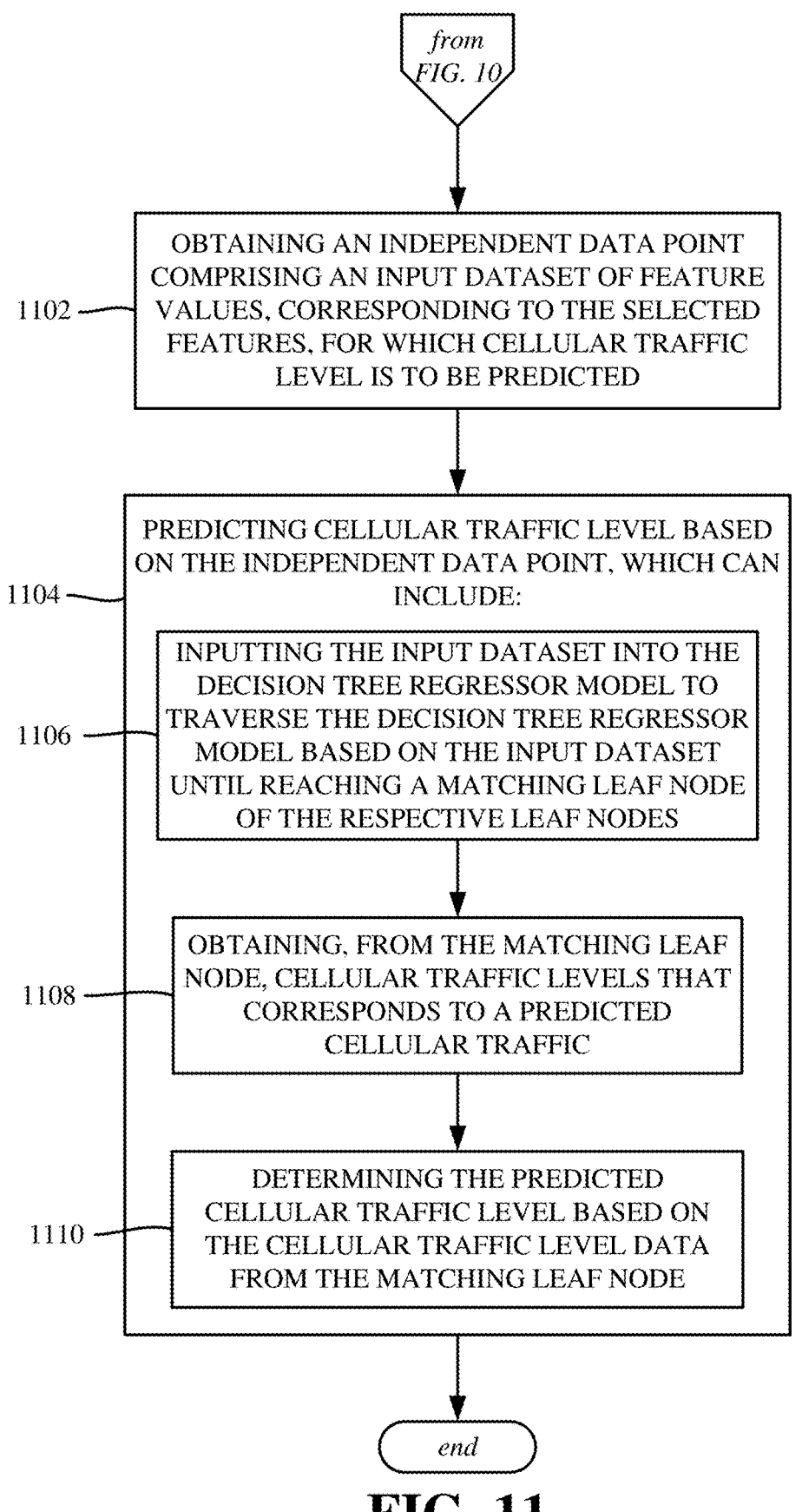

from
FIG. 10

1102 —— OBTAINING AN INDEPENDENT DATA POINT COMPRISING AN INPUT DATASET OF FEATURE VALUES, CORRESPONDING TO THE SELECTED FEATURES, FOR WHICH CELLULAR TRAFFIC LEVEL IS TO BE PREDICTED

1104 —— PREDICTING CELLULAR TRAFFIC LEVEL BASED ON THE INDEPENDENT DATA POINT, WHICH CAN INCLUDE:

1106 —— INPUTTING THE INPUT DATASET INTO THE DECISION TREE REGRESSOR MODEL TO TRAVERSE THE DECISION TREE REGRESSOR MODEL BASED ON THE INPUT DATASET UNTIL REACHING A MATCHING LEAF NODE OF THE RESPECTIVE LEAF NODES

1108 —— OBTAINING, FROM THE MATCHING LEAF NODE, CELLULAR TRAFFIC LEVELS THAT CORRESPONDS TO A PREDICTED CELLULAR TRAFFIC

1110 —— DETERMINING THE PREDICTED CELLULAR TRAFFIC LEVEL BASED ON THE CELLULAR TRAFFIC LEVEL DATA FROM THE MATCHING LEAF NODE end

FIG. 11

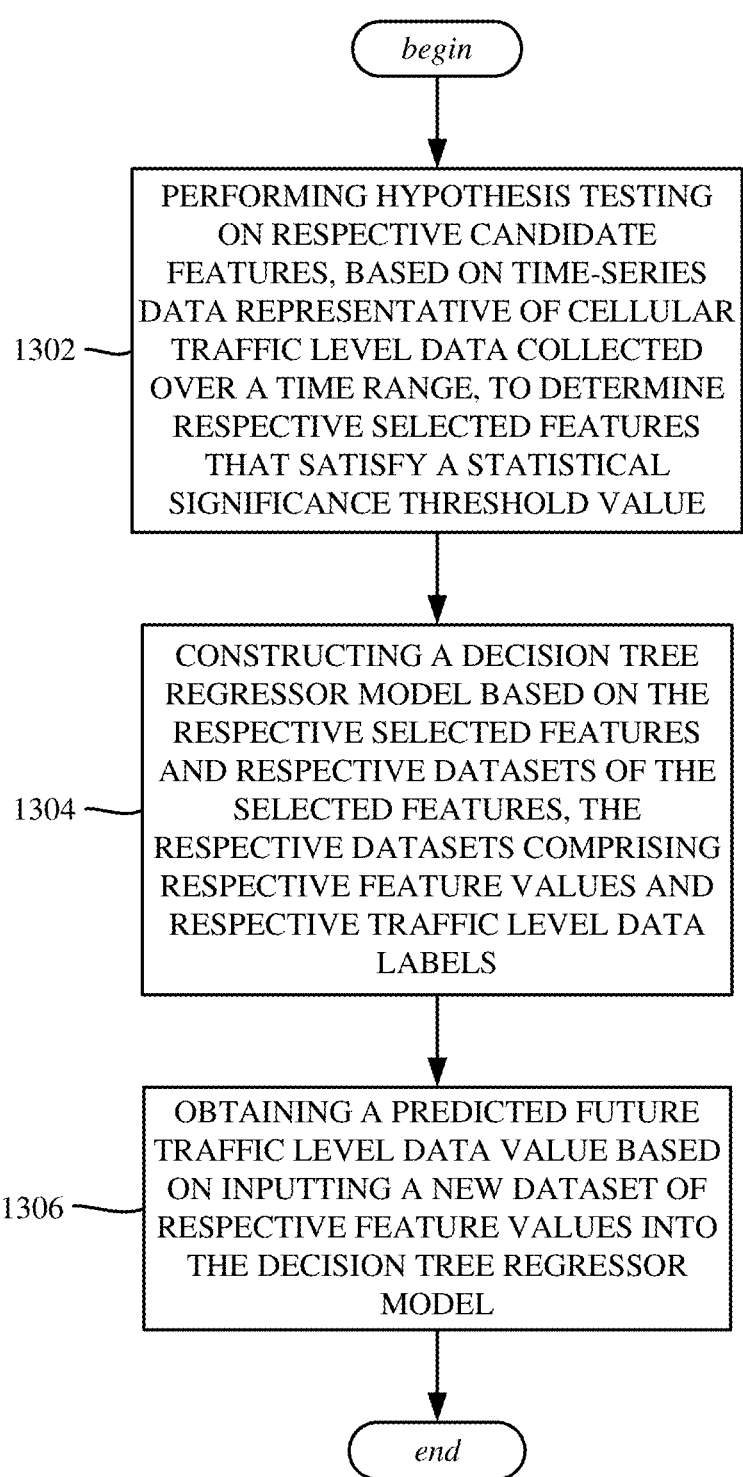

begin

1302 — PERFORMING HYPOTHESIS TESTING ON RESPECTIVE CANDIDATE FEATURES, BASED ON TIME-SERIES DATA REPRESENTATIVE OF CELLULAR TRAFFIC LEVEL DATA COLLECTED OVER A TIME RANGE, TO DETERMINE RESPECTIVE SELECTED FEATURES THAT SATISFY A STATISTICAL SIGNIFICANCE THRESHOLD VALUE

1304 — CONSTRUCTING A DECISION TREE REGRESSOR MODEL BASED ON THE RESPECTIVE SELECTED FEATURES AND RESPECTIVE DATASETS OF THE SELECTED FEATURES, THE RESPECTIVE DATASETS COMPRISING RESPECTIVE FEATURE VALUES AND RESPECTIVE TRAFFIC LEVEL DATA LABELS

1306 — OBTAINING A PREDICTED FUTURE TRAFFIC LEVEL DATA VALUE BASED ON INPUTTING A NEW DATASET OF RESPECTIVE FEATURE VALUES INTO THE DECISION TREE REGRESSOR MODEL end

FIG. 13

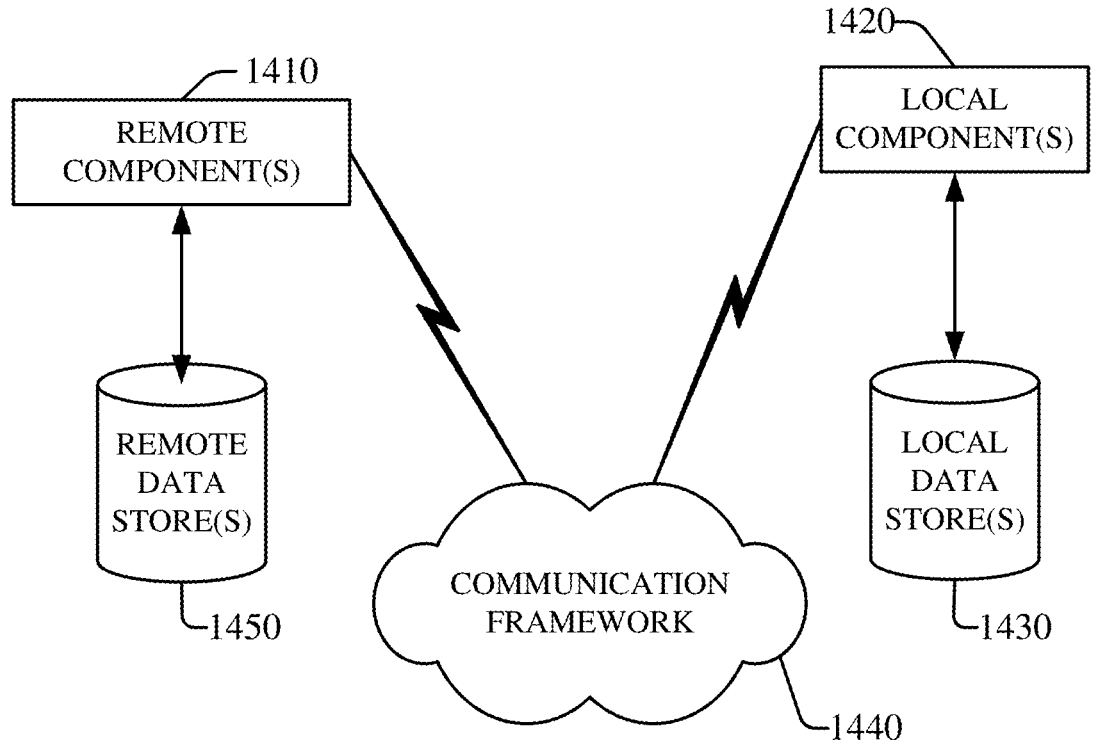
FIG. 14

LOW COMPLEXITY CELLULAR TRAFFIC PREDICTION

BACKGROUND

Wireless network traffic has increased rapidly, whereby network operators upgrade their networks based on careful planning, with a general goal of providing adequate coverage and capacity as needed. However, with increasing network traffic, the overall network becomes more complex to manage due to new technical features being built into the network and the scale of the network itself. Network management systems often rely on traffic forecasting by leveraging various network measurement data, however traffic forecasting approaches that have been attempted suffer from various drawbacks.

BRIEF DESCRIPTION OF THE DRAWINGS

The technology described herein is illustrated by way of example and not limited in the accompanying figures in which like reference numerals indicate similar elements and in which:

FIGS. 10 and 11 comprise a flow diagram showing example operations related to constructing a decision tree regressor model based on training data, and predicting cellular traffic level data via the decision tree regressor model, in accordance with various embodiments and implementations of the subject disclosure.

FIG. 13 is a flow diagram showing example operations related to obtaining a predicted future traffic level data value based on inputting a new dataset of respective feature values into a decision tree regressor model trained with feature data of statistically significant features, in accordance with various embodiments and implementations of the subject disclosure.

FIG. 14 is a block diagram representing an example computing environment into which embodiments of the subject matter described herein may be incorporated.

DETAILED DESCRIPTION

Figure 1:
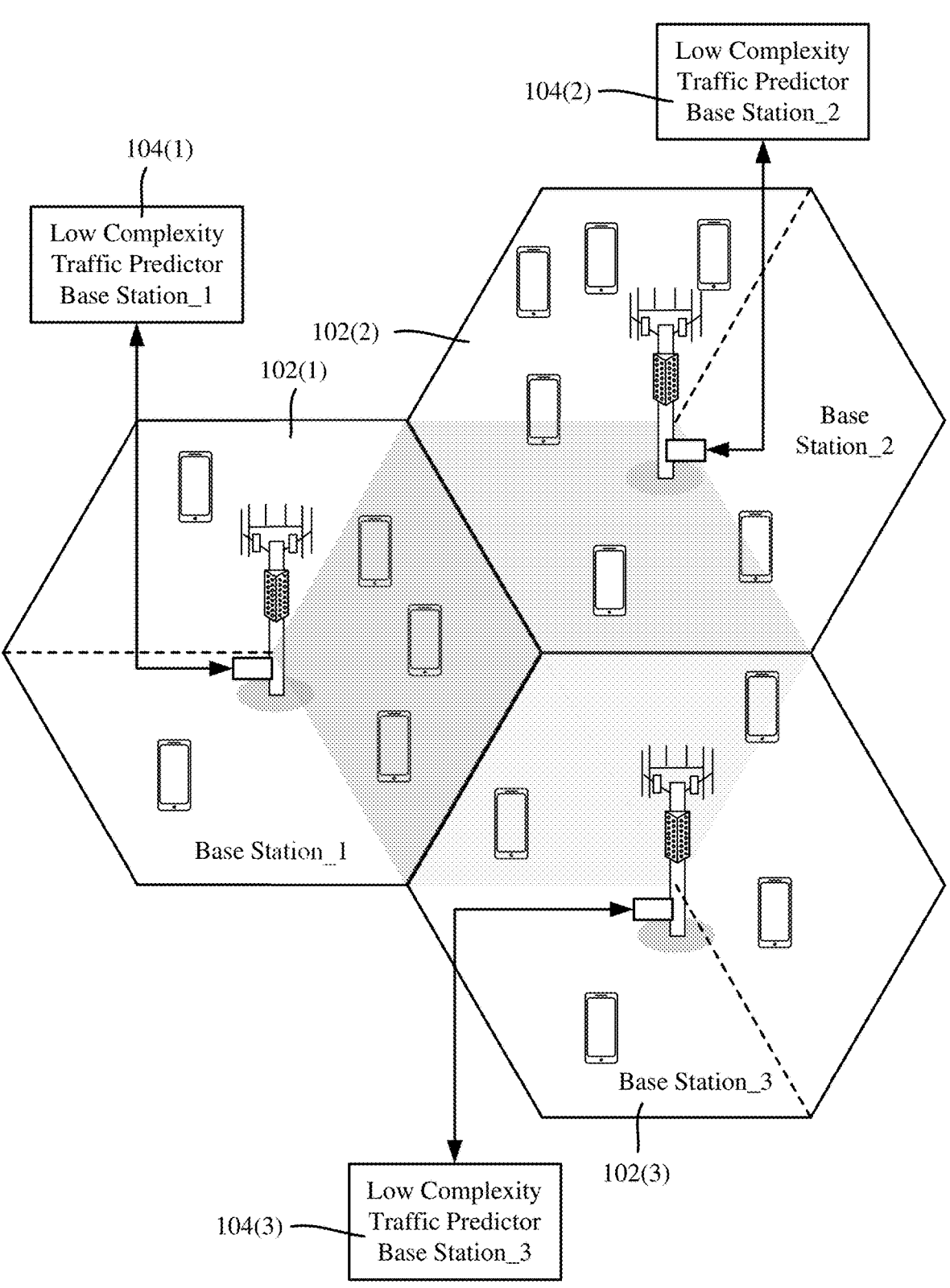
FIG. 1 is a block diagram showing an example system/ architecture of a cellular network comprised of base stations with associated per-base station low complexity cellular traffic predictors, in accordance with various embodiments and implementations of the subject disclosure.

The technology described herein is generally directed towards a low complexity decision tree-based traffic predictor model that has accuracy comparable to more complicated machine learning predictors, while using significantly less compute resources compared to the high complexity predictors. In one implementation, the low complexity decision tree-based traffic predictor model can be a decision tree regressor model that is rapidly and efficiently trained at a base station based on time series data, e.g., for that base station, using only relatively low-power processing and a relatively low amount of memory.

In general, network management systems, in an effort to be proactive rather than reactive to network events, often rely on traffic forecasting by leveraging various network measurement data. In legacy networks this was done using autoregressive statistical prediction systems such as based on autoregressive integrated moving average (ARIMA); however autoregressive statistical prediction systems often are highly inaccurate for contemporary networks. More recently machine learning-based methods, e.g., relying on long-short term memory (LSTM) and convolutional neural network (CNNs) have been proposed, however these complex models inherently need significant (typically offline) compute resources and training data to function well, while consuming significant energy. Moreover, such complex models take a significant amount of time to train and make a prediction, whereby the prediction is often outdated relative to current traffic conditions. As a result, these models are not practical to implement in many scenarios, such as on an embedded processing unit of a base station, for example, because of their high operational expense.

Described herein is a low complexity data-driven cellular traffic prediction model that can be implemented on an embedded processing unit, for example, which is very fast to train, including with current time-series data, and fast to return a traffic prediction. In one example implementation, further benefits with respect to improved accuracy and training speed are obtained by selecting only features from the time-series data that are determined to be significant with respect to having an impact on the aggregate traffic demand. Hypothesis testing can be used to determine a probability value (p-value) for each available candidate feature from collected time series data, where the p-value represents the statistical significance of that feature. Filtering selects only the features that satisfy a threshold p-value for use in the training of the decision tree regressor model. Note that hypothesis testing to select statistically significant features as described herein is not limited to decision tree regressor models, but also provides benefits with other machine learning cellular traffic prediction models, e.g., neural network models.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a generalized block diagram of an example general cellular network system/architecture 100 including three base stations 102(1)-102(3) corresponding to three cells. As is understood, this is only a simplified example, and a network can have any practical number of base stations. In the example of FIG. 1, each cell is further subdivided into three cell sites, each cell site covered by a sectorial antenna covering 120 degrees as shown by the shaded regions and dashed lines dividing the three example base stations 102(1)-102(3) into three sectors each.

The traffic demand for each of these cell sites is distinctly determined by the user equipment devices (UEs, not separately labeled) that are in their respective coverage areas and place transmission requests to their corresponding base stations. As can be understood, the cellular traffic load level thus varies over time for various reasons, including some various non-limiting reasons described herein.

The base stations 102(1)-102(3) include or are coupled to traffic predictor modules 104(1)-104(3), respectively. In one example implementation described herein, the traffic predictor modules 104(1)-104(3) are directly incorporated into the equipment (e.g., processing hardware and memory) of each base station 102(1)-102(3), facilitating fast, current and per-base station-specific traffic prediction data for that base station, which can be for the entire base station, or, for more specific predictions, per the individual subdivided cell sites of that base station. Thus, for example, the traffic predictor module 104(1) can operate individually for each cell site sector, and can operate as described herein to predict the traffic for each cell site of its base station 102(1).

Cellular traffic used to follow a somewhat general daily variation pattern in which the time of day was often the predominant factor, e.g., low traffic in the very early morning, increasing throughout the morning and afternoon to a peak in the mid-evening, and then dropping throughout the night back to the very early morning low. This was sufficient when the base stations were designed based on the maximum expected traffic levels, without considering traffic variations. However, in modern networks, the dynamic nature of user behavior and the impact of external factors, including the characteristics of the deployment scenario, can cause vast differences in a cell site's traffic during weekdays and weekends, holidays, and large gatherings, for example. Further, more contemporary base stations can adapt their resource usage (modify their incremental capacity to match throughput) and corresponding power consumption dynamically, whereby unnecessary overprovisioning of the resources can be mitigated, compared to base stations designed based on peak capacity only. Thus, accurate traffic forecasting in modern networks for an upcoming duration (e.g., a short duration such as the next half-hour) based on at least some measured traffic data that is also able to incorporate trends based on relatively recent traffic variations is highly desirable.

As described herein, the traffic level prediction for an upcoming timeframe can be based on recently collected traffic statistics. However, the traffic level prediction can also be based on longer term historical information related to traffic demand that the given cell site experiences (temporal correlation), such as what was measured last year, last month, last week, yesterday and so on. Further, as described herein, in some situations due to relative proximity, a traffic predictor for a base station may use more recent and/or longer term historical traffic information of the base station's neighboring sites as well, that is, leveraging spatial correlation data, when available and appropriately relevant.

Figure 2:
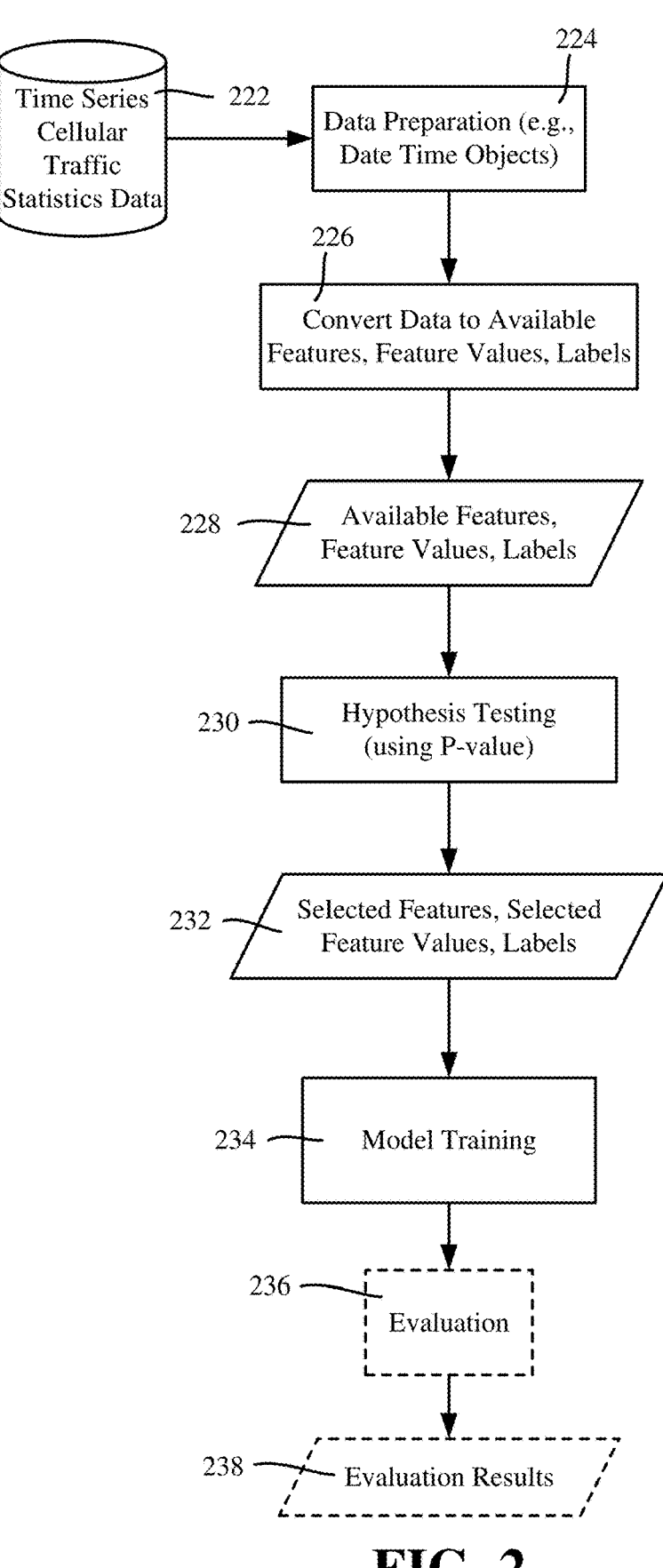
FIG. 2 is a block diagram/dataflow diagram showing an example pipeline for training a model based on cellular traffic statistics data, in accordance with various embodiments and implementations of the subject disclosure.

FIG. 2 shows an example pipeline of traffic prediction modules and/or operations in which traffic-related data flowing through the pipeline results in a trained prediction model. Thus, in this example implementation, cellular traffic statistics data 222 for a base station (which can be per site sector) is processed by a data preparation operation 224. This can include, but is not limited to, known preprocessing operations that clean data with respect, readily apparent outliers suggestive of equipment or measuring errors, missing data, and so forth. More particularly, known data preparation techniques (which is done regardless of the type of machine learning model to be trained) can be used to compensate for random blanks, incorrectly captured data, numerical errors, outliers, gaps, incomplete data and so on. Note that if spatiotemporal data from one or more neighboring sites is available, such data can also be used for data completion; (note however that the use of such spatiotemporal data is not limited to filling in missing data, but can also be used as a source of feature data as described herein).

Operation 226 and corresponding data block 228 represents converting the time series data to candidate training data of available features, feature values and labels that are appropriate for training a machine learning model. For example, consider that the time series data can be converted to datetime objects via various functions and can be subsequently processed by existing data processing libraries for mapping of various features, their respective feature values.

In one implementation, example available features 238 (the labeled data points) engineered in this way from the traffic data 222 include day name (e.g., Tuesday), day of month (e.g., 26), day hour, and day minute for each group of features having a known label. The day name is then one-hot encoded, which results in seven additional features.

In one example implementation described herein, the data points of the resultant feature values and their labels need not all be used to train a model, whereby the group of available features can be considered candidate features. Instead of using all available features, the technology described herein performs hypothesis testing (block 230) to select only features that are statistically significant. More particularly, before feeding the engineered temporal features, hypothesis testing is first used to ensure whether each candidate feature actually has an impact on the aggregate traffic demand. In order to filter out data points based on this criterion, in one example implementation hypothesis testing using p-value (probability value) is included in the machine learning pipeline/data path. In general, the p-value testing determines the statistical significance and the measure of significance testing, and represents the probability of observing sample data that is at least as extreme as the observed sample data, assuming that the null hypothesis is true. The lower the p-value, the greater the statistical significance of the observed difference. For example, a p-value of 0.05 (confidence of 95%) or lower is generally considered statistically significant (although 0.01 is sometimes used, and there is no requirement that any specific p-value threshold is used).

In any event, in one implementation, to run this test against the features, the p-value of each candidate feature and the test traffic data is calculated, and if its value exceeds the p-value threshold of 0.05, then the candidate feature is dropped, that is, is not one of the selected features that will be used to train the model. Note that in actual scenarios, feature selection based on the p-value threshold of 0.05 was found to provide very accurate predictions; notwithstanding, the technology described herein is not limited to any particular p-value threshold, and indeed, in alternative implementations, other p-values thresholds can be used, or candidate features can be ranked by their statistical significance values to select the most statistically significant m (e.g., four or five) features for use in model training.

The base station location is often significant with respect to which features are selected. By way of example, in one location, the hour was statistically significant, and some days (e.g., Tuesday or Wednesday) were not determined to be significant features, whereas the feature data for Friday feature was significant. At a different base station located at a university setting, every day from Monday through Friday were significant features, but weekends were less significant. In general, the minute feature may not be significant. Thus, per base station training is appropriate for accurate prediction for each base station.

It should be noted that the technology described herein works with any machine learning model that can be trained on multiple features, although autoregressive models have been found inaccurate. Thus, for example, the model can be any of a recurrent neural network model, a convolutional neural network model, a long-term short-term model, a feed forward network model, a graph neural network model, or a recursive neural network model. Further note however that while such machine learning models also work, at present they take too much time and computational resources to be used for real-time or near real-time predictions, nor can they be deployed at base stations or the like where having limited, low power resources is desired. As such, decision tree regression models are one desirable model described herein, which are suitable for real-time predictions at base stations based (at least in part) on very recent traffic data due to their low complexity (e.g., a single layer versus multiple layers of a neural network), low power resource usage, fast training time, and fast traversal to obtain a prediction.

Following filtering of candidate features by statistical significance, a group of respective data points of the selected features, their associated feature values, and their respective labels is obtained (data block 232). Note however that not all of this group of data points is used for training, as some samples are used for testing. More particularly, in time series predictions, if there are, for example, 1,000 samples from 0-999, they are split into training data samples and testing data samples before deploying the model, with training performed using the older samples, e.g., from data point 0 to 799, and testing performed using the later samples, e.g., 800 to 999. This is often done to avoid data leakage, where data leakage in machine learning refers to the use of information in the model training process that would not be expected to be available at prediction time, causing the model to have a high accuracy in training and testing, but performing badly when running the model in a production environment. Because for the model the last data points are considered the "future to it", the model should not learn from that data.

The training portion of this group is thus used to train the machine learning model, which in one example implementation is a decision tree regressor model as described herein. Once trained, the model can be deployed for use in predicting future traffic levels as also described herein. The trained model also can be evaluated (blocks 236 and 238) by comparing the predicted results with the actual measured data; while not done in typical deployment scenarios, such evaluations can be used to adjust the overall training process, e.g., stochastic gradient feedback can be used to improve weights within a tree structure model, select among available historical data that results in more accurate predictions, tweak the stopping criteria for a tree's decision branch splitting, and so on for any user-controllable variable in the model training.

Figure 3:
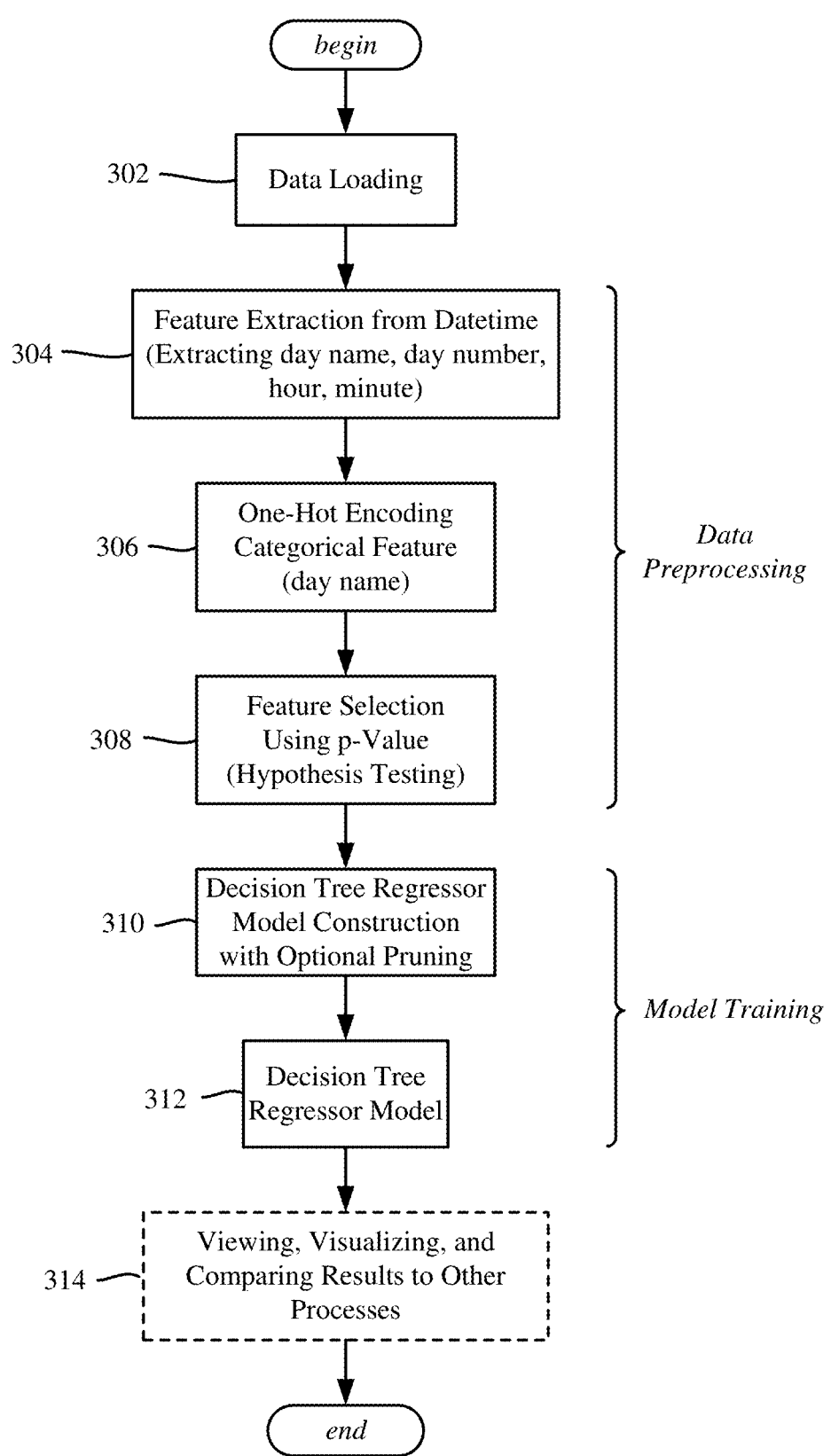
FIG. 3 is a block diagram/dataflow diagram showing details of example pipeline for training a decision tree regressor model based on selected features of time series cellular traffic statistics data, in accordance with various embodiments and implementations of the subject disclosure.

FIG. 3 is a somewhat similar example pipeline and dataflow representation to that of FIG. 2, with details more specific to training a decision tree regressor model with the time series features described herein. Block 302 represents loading the data, from which the candidate features are extracted (block 304) via the datetime object or the like. These candidate features include day name, day number, hour and minute in this example. Operation 306 represents one-hot encoding the day name into seven additional features.

Operation 308 represents feature selection based on statistical significance evaluation, which is p-value based hypothesis testing in this example. Operation 310 represents the decision tree regressor model construction (with optional pruning of one or more of the branches), resulting in a trained decision tree regressor model (block 312). As in FIG. 2, block 314 represents optional evaluation of the trained decision tree regressor model 312, e.g., viewing, visualizing and/or comparing the prediction results to other processes. Ways to assess the performance of the decision tree model can use evaluation metrics such as mean squared error (MSE), mean absolute error (MAE), or R2-score.

Although deep learning-based methods are being used for traffic prediction, a tree-based approach (based on a flow-chart-like structure that represents a series of decisions and their possible consequences) for cellular traffic prediction as described herein achieves results that are demonstrably within tolerance levels, with little fine-tuning and significantly lower computational effort that do not require a repeated computation of high-precision weights or multiply-accumulate operations that require increasing bit-widths. In contrast, deep-learning based approaches need substantial effort to arrive at a suitable deep learning architectures, while also needing high power consuming resources and training time due to the increased intermediated computations. Note that decision tree-based approaches are typically used with tabular data where both input and outputs are available to determine the functional relationship between the input and output; in traffic prediction however, this is not the case, as only the observed traffic data in the form of call data records or physical resource block (PRB) utilization are available. Further, PRB utilization is available only when the granularity of the data collection allows for it. Thus, the problem is recast as a supervised machine learning problem, along with forming the data pipeline with appropriate feature engineering as described herein with reference to FIGS. 2 and 3. An advantage of decision tree regressors is that they are able to handle non-linear relationships between input features and the target variable, which is appropriate for cellular traffic levels, as the time of day and traffic level typically do not have a linear relationship (and seasonal traffic may also have a role to play).

Decision tree construction is generally well known, and is thus only summarized herein. A decision tree is constructed by recursively splitting the training data (input datasets for the selected features) into subsets based on the values of the input features. In the context of time series forecasting, a decision tree regressor can be trained on historical time series data to predict future values.

More particularly, following data preparation, an automated process iterates through the feature data in order to determine the 'best split' at each decision level. The process starts at the root node and evaluates the different features to determine the best split, calculating a splitting criterion, such as mean squared error (MSE) or mean absolute error (MAE), for each feature by measuring the impurity of the resulting subsets. The process operates to find the feature and corresponding splitting threshold value that reduces the impurity the most for the subsets of a decision node.

Once the best split is determined for a decision node, the dataset is divided into two or more subsets based on the selected feature and the splitting threshold value that was previously determined. Each subset represents a further branch of the decision tree. The samples are assigned to the appropriate branch based on their feature values, e.g., those above the splitting threshold value and those below the splitting threshold value.

The decision tree grows recursively, which can be in parallel to an extent, as the process recursively repeats the above operations for each subset (branch) created in the previous step. That is, at each next level decision node, the process evaluates the different features in the subsets to select the best feature to split on at that level, along with the splitting threshold criterion, based on the lowest impurity of the resulting subsets. The process continues splitting the data until a termination criterion is met. This termination criterion can be defined by a user or the like as any of reaching a maximum tree depth, reaching a point where there is a minimum number of samples needed to split a node, having a split that results in zero error (or other very low impurity value), having no more features, and/or other stopping condition(s).

When a termination criterion is met, the recursive splitting process ends. At this point, a leaf node is created, representing final prediction data for the branch based on the traffic prediction labels.

Creation of the leaf node may be followed by an optional pruning operation, which helps to reduce any overfitting of the tree model to the training data, (as decision trees can be prone to overfitting). Additionally, decision tree pruning, which is well known and not further described herein, helps simplify the tree and can improve the tree's generalizability. It should be noted that in addition to the optional pruning, the hypothesis testing as part of the data preprocessing operations as described herein, has been consistently found to increase accuracy, as feature selection based on statistical significance also helps mitigate overfitting, resulting in a more accurate prediction model.

Figure 4:
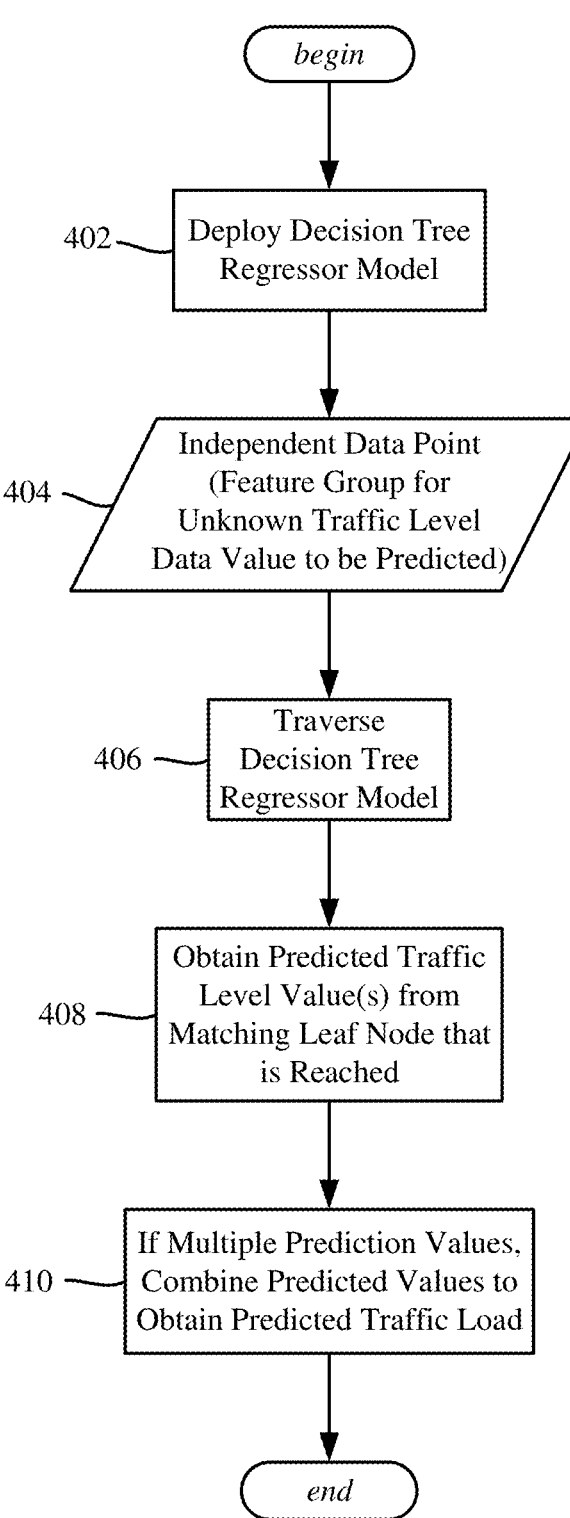
FIG. 4 is a block diagram/dataflow diagram showing details of inputting an independent data point of feature data values into a trained decision tree regressor model to obtain a traffic level prediction value, in accordance with various embodiments and implementations of the subject disclosure.

Once the model is constructed, predictions for new data points (sometime referred to as independent data points or independent variables) can be efficiently determined. For example, as shown in FIG. 4, once the model is deployed (block 402) for a base station, e.g., as trained at the base station using its own data, an independent data point is obtained as represented by block 404. The independent data point can be a single (e.g., current set of feature values), or a composite set averaged or otherwise combined from a group of current sets of collected feature values, e.g., current state data collected over the last t minutes. This can help avoid making a prediction based on too sparse of a current sample.

Based on the feature values input from the data point, the process traverses the decision tree (block 406) by evaluating the feature values of the data point at each node to follow the appropriate branch until reaching a matching leaf node with respect to matching the input feature data. The predicted traffic level data (target variable) is associated with that matching leaf node (block 408). Often the predicted traffic level data corresponds to more than one label; the final predicted value is typically the mean or median of the target variable (the corresponding label(s)) in that leaf node (block 410), which can be determined once reached by the traversal, or when the decision tree was previously trained and that leaf node created. Note that instead of or in addition to a composite set of input feature values, multiple predictions can be obtained for multiple feature values (e.g., from current state data collected over the last t minutes), with the predicted cellular traffic level value obtained by combining (e.g., averaging) the multiple predictions.

While decision tree regressors are very suited for accurate traffic prediction as described herein, many other models, including regressor models, may be used based on the technology described herein. Such models include, but are not limited to, k-nearest neighbors regressor, extra tree regressor, extra trees regressor, Gaussian process regressor, gradient boosting regressor, XGBregressor (extra gradient boosting), Hist gradient boosting regressor, random forest regressor, AdaBoost regressor, bagging regressor, LGBM regressor (light gradient boosting machine), MLP regressor (multilayer perceptron), Lasso based, Lars based, ridge, Bayesian ridge, Linear regression, transformed target regressor, SGD regressor (stochastic gradient descent) ElasticNetCV (where CV denotes cross validation), orthogonal matching pursuitCV, ridgeCV Huber regressor, Poisson regressor ElasticNet, Tweedie regressor, NuSVR, gamma regressor, passive aggressive regressor, SVR (support vector regression), orthogonal matching pursuit, linearSVR, dummy regressor, RANSAC regressor, and KernelRidge.

Figure 5:
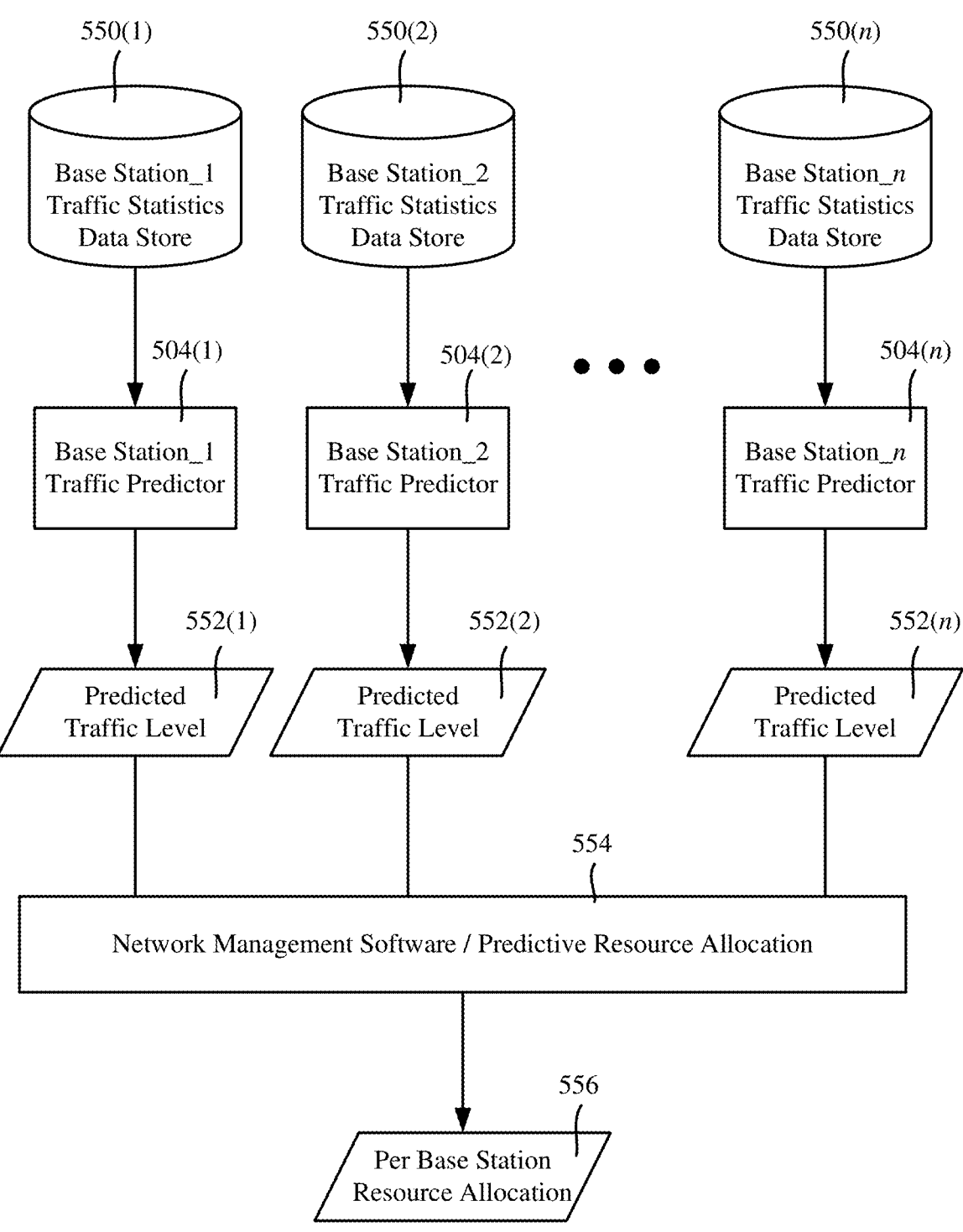
FIG. 5 is a representation of resource allocation among respective base stations based on respective traffic prediction levels, in accordance with various embodiments and implementations of the subject disclosure.

Turning to another way to use predicted traffic level data, FIG. 5 shows network resource allocation based on the predicted traffic level values for multiple base stations/ clusters of cell sites, managed through a single network management system module 554 in this example (e.g., at a distributed unit or a centralized unit, which can depend on the base stations/cell sites for which resource redistribution is being considered). The cluster may be all or any part of a network, e.g., resource redistribution for downtown base station deployments versus rural base station deployments in the same network, and there can be different clusters in this regard.

In one example implementation the base stations each maintain an individual data store (e.g., database) 550(1)- 550(n) of traffic statistics, with the individual data stores 550(1)-550(n) used by respective traffic predictors 504(1)- 504(n) that each predicts the traffic, e.g., only for that base station. Some common functionality such as the knowledge of network outage events and the like also may be provided to the centralized network management system 554. As a result, resources can be reallocated among the base stations, e.g., spectrum redistribution can be accomplished based on current demand in a relatively dynamic manner.

Note that while each of the individual traffic predictors 504(1)-504(n) is depicted separately in FIG. 5, it is not necessary to implement them on different/distributed hardware platforms; (note however that in some deployment scenarios as in FIG. 9 they are implemented on different/ distributed hardware platforms due to the proximity of the computational platform to the radio unit). Thus, for example, in certain scenarios the traffic predictors 504(1)-504(n) potentially may be hosted on the same edge server or more centralized server, although each traffic predictor was trained (at least primarily) based on its own base station's data.

Figure 6:
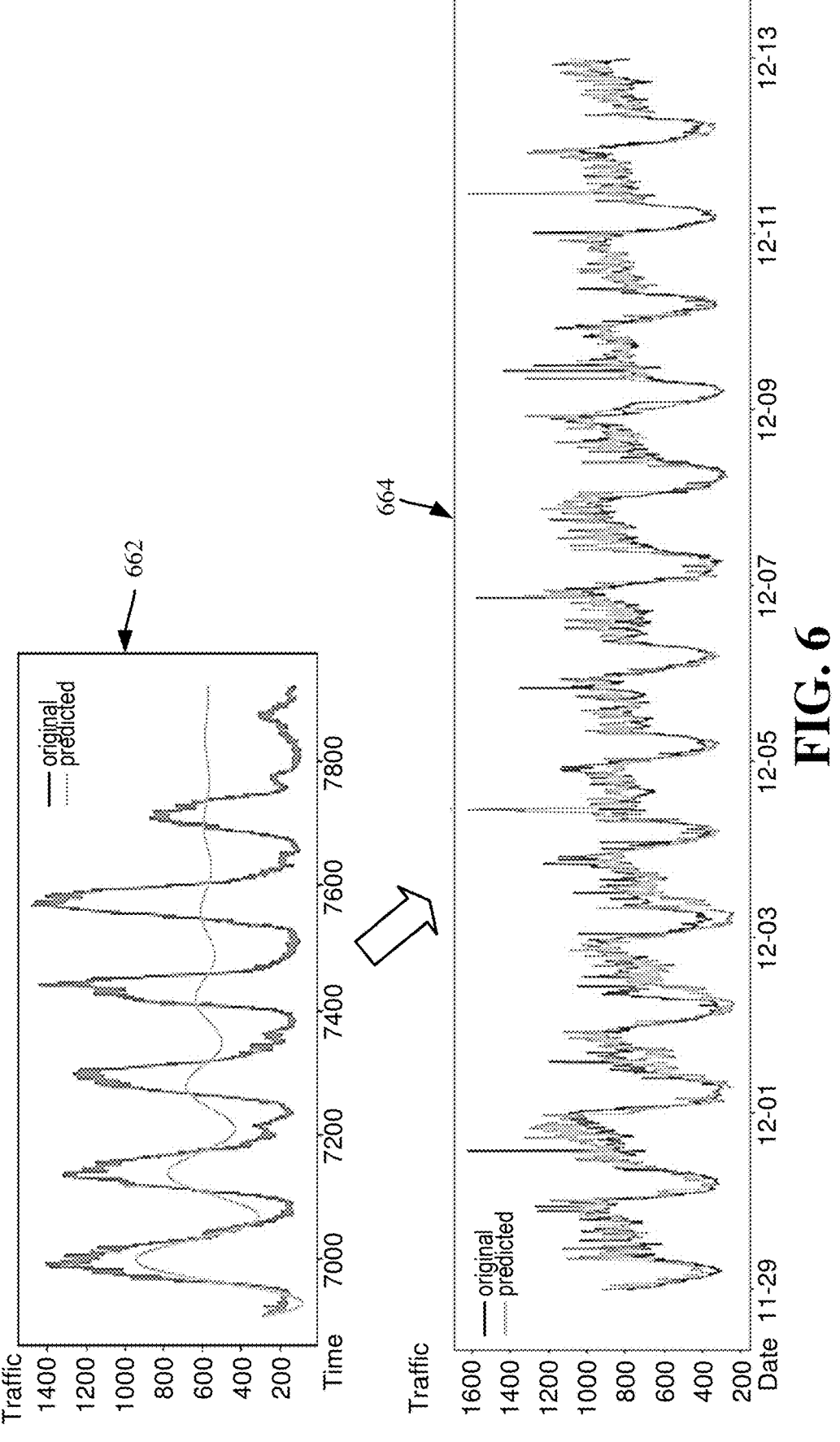
FIG. 6 is a graphical representation of example actual cellular traffic data, collected for another base station deployment over a time period (e.g., showing a fourteen day representation in FIG. 6), versus cellular traffic data predicted by a decision tree regressor model, (along with autoregressive-based prediction data), in accordance with various embodiments and implementations of the subject disclosure.
Figure 7:
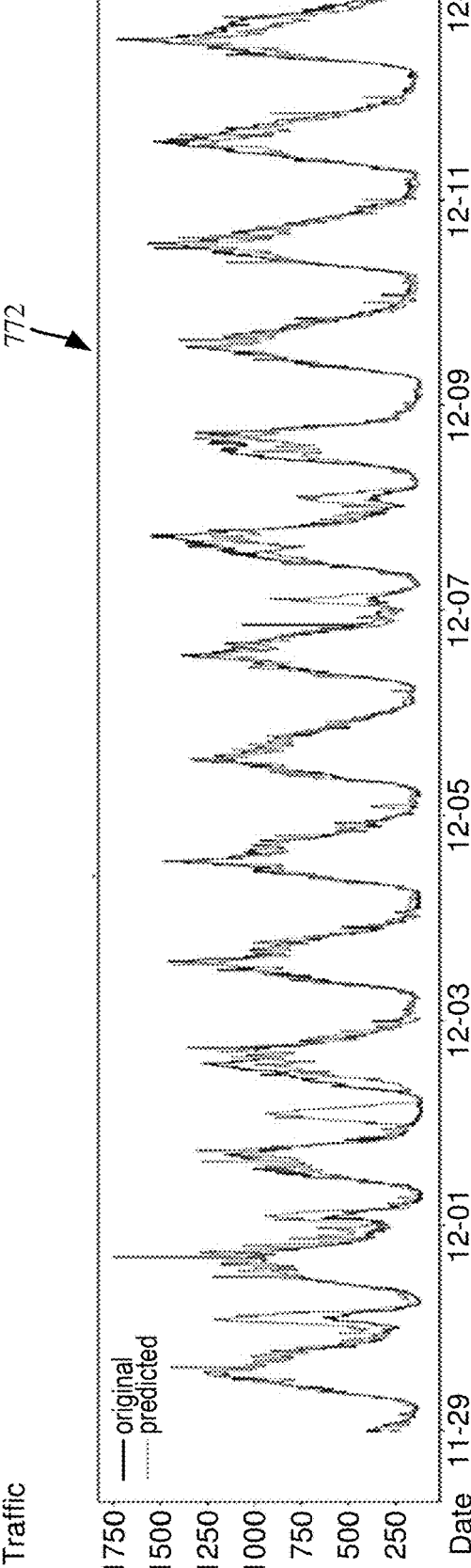
FIG. 7 is a graphical representation of example actual cellular traffic data, collected for one base station deployment over a time period (e.g., showing a fourteen day representation in FIG. 7), versus cellular traffic data predicted by a decision tree regressor model, in accordance with various embodiments and implementations of the subject disclosure.
Figure 8:
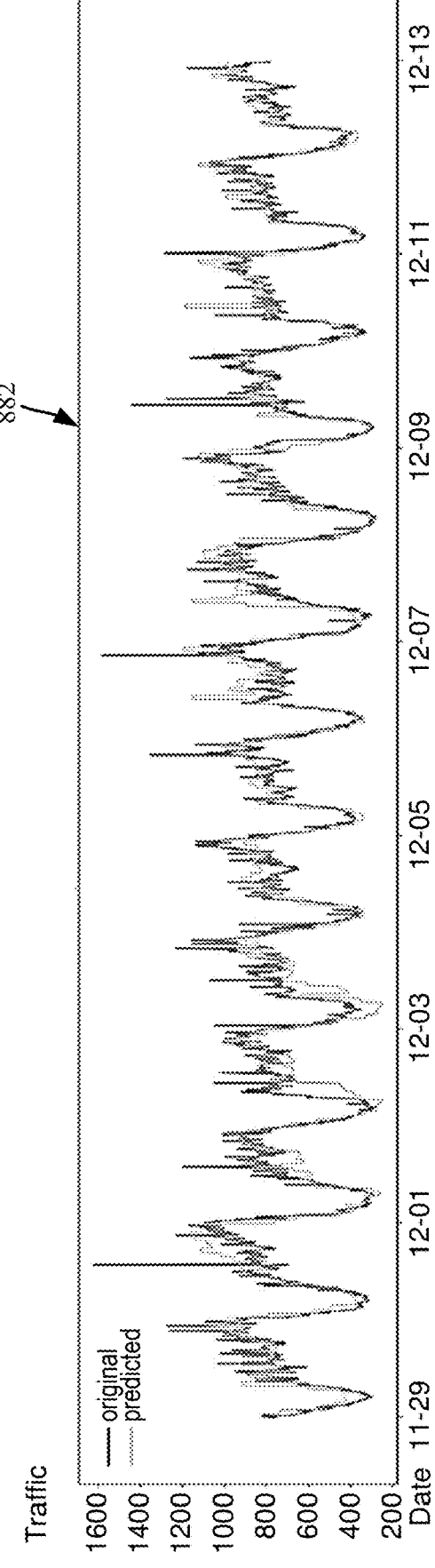
FIG. 8 is a graphical representation of example actual cellular traffic data, collected for the base station deployment of FIG. 7, versus cellular traffic data predicted by a decision tree regressor model in which training data features were selected based on hypotheses testing, in accordance with various embodiments and implementations of the subject disclosure.

By way of some examples, testing was performed for three different publicly available cellular network traffic datasets that captured the cellular traffic in various urban areas over a period of two months as depicted in FIGS. 6-8. Note that comparisons were made with only feed forward style networks (FFNs) where information flows in only one direction. Although recursive neural networks (RNNs) and architectures such as LSTMs can address the vanishing gradient limitation often faced by neural networks, whereby such architectures may provide higher accuracy, the computational complexity of such methods is much higher than what can be afforded by constrained platforms such as embedded processors.

As shown in FIG. 6, graph 662, the traffic load predictions of an autoregressive model (ARIMA) versus the actual traffic load data becomes significantly more and more inaccurate over time. Indeed, while autoregression is a concept often used in time series forecasting, which assumes that the future values of a variable are based on its past values by considering a number of lagged values to include in order to forecast future values of a variable, with some models including other concepts like moving average, autoregression in general does not provide a good cellular traffic predictor, and/or needs highly intensive manual weighting. In general, if the current predicted value has a large error, that error propagates to future predicted values, making the predictions less accurate; in some models, the error could be unbounded.

In contrast, the graph 664 (representative of a two week sample) uses decision tree-based forecasting of traffic levels, collected from a "city center" base station scenario, which provides future values without using autoregression, therefore making the predictions independent of each other. Unlike autoregression, if a decision tree model's current prediction has a large error, that error does not propagate to future values.

FIGS. 7 and 8 show another base station deployment scenario corresponding to a "nightlife" geographic area where cellular activity at night is relatively high, e.g., compared to the nighttime cellular activity of a residential community's base station that has few nighttime retail businesses. FIG. 7 shows a graph 772 of a decision tree regressor model trained with all available candidate features, e.g., used for training the decision tree regressor mode without hypothesis testing preprocessing to select the feature data. While still significantly more accurate than autoregression models, the performance in terms of prediction accuracy is not as good as the prediction accuracy when hypothesis testing was used to select only the statistically significant features for training the decision tree regressor model (FIG. 8, graph 882).

The following table presents the relative performance of the model trained without and with hypothesis testing, i.e., the performance comparison for before and after using the hypothesis testing:

|  | DT Regressor without Hypothesis Testing | DT Regressor with Hypothesis Testing |
|---|---|---|
| Mean Absolute Error | 104 | 95 |
| R2 Score | 0.54 | 0.629 |

Testing used the conventional performance measures of mean absolute error (MAE) and the R2 score (also called coefficient of determination) that determines the fit of the model to the observed data. R2 values are restricted to between 0 and 1, with a higher score reflecting a better fit. Note however that an R2 score of 1 potentially may not be desirable as that invariably implies the model is deterministic and therefore that a perfect prediction is possible; (such cases do not require an ML-based approach). As can be seen, there are definite improvements that result from applying the hypothesis testing to select the features for the decision tree regressor.

Analysis of cellular traffic patterns based on historical data has revealed that such data possesses a distinct temporal periodicity, and in some deployment cases spatial correlation as well. Such periodicity and memory/correlation features can be exploited to obtain more accurate traffic predictions for some time in the future so that network management, in terms of both capacity as well as user pricing and/or quality of service improvements may be employed by network operators. Reducing energy consumption of the network and thus reducing network operational expenses (OpEx) has become a significant network operator consideration.

In terms of leveraging patterns, the traffic for a particular time during the week can be predicted based on the data for the same time of the day in previous weeks, for example. A further distinction can be made by distinguishing between weekends and weekdays, which may improve prediction accuracy but puts the weekend prediction at risk due to relatively less data for this period. Distinguishing only between weekends and weekdays may, however, miss the diurnal patterns by being unable to distinguish between days of the week. Addressing these issues as described herein implies the use of a lot more data, as poor performance may be observed in the absence of large amounts of data.

Described herein is the ability to also exploit spatial correlation, e.g., using two sets of decision trees instead of only using the temporal features to make predictions, e.g., based on the concept that neighbor base stations often experience similar traffic, with spatial correlation/spatial similarity. The feature engineering described herein to obtain feature-based training data can be extended to include spatial features, as well such as the cross-correlation of the traffic demand, with the longitude and latitude of neighboring base station(s). To this end, if a spatial features can also pass the hypothesis testing, then that feature also can be included in building out a tree structure, e.g., the decision tree regressor chosen because of its simplicity, interpretability, and ability to work real-time without consuming many resources.

Thus, spatial correlation facilitates the use of not only data over time, but also spatial dimension data, such as resulting in two decision trees for the two-dimensional, spatiotemporal data which can be juxtaposed, e.g., there can be individual decision trees per base station, with information combined with the information from other base stations through spatial correlation to obtain a better prediction result. Spatial dependency (i.e., from one or more neighboring base stations), can be very significant in a wireless network, whereby discovering both temporal and spatial dependencies that provides spatial feature correlation in a separate dimension can improve the quality of prediction, e.g., based on selecting spatial features that pass the p-value hypothesis testing. Training multiple decision trees is practical, as training takes almost no time relative to other machine learning models.

Note that a decision tree regressor model has been found to be significantly superior to the use of a random forest approach, which tends to have an ensemble of trees. While applicable to several other regression and classification tasks, random forests have been found to be unsuitable for low-complexity traffic prediction, as in general the computational needs for random forest prediction are several orders of magnitude higher than needed to implement a decision tree regressor model.

Figure 9:
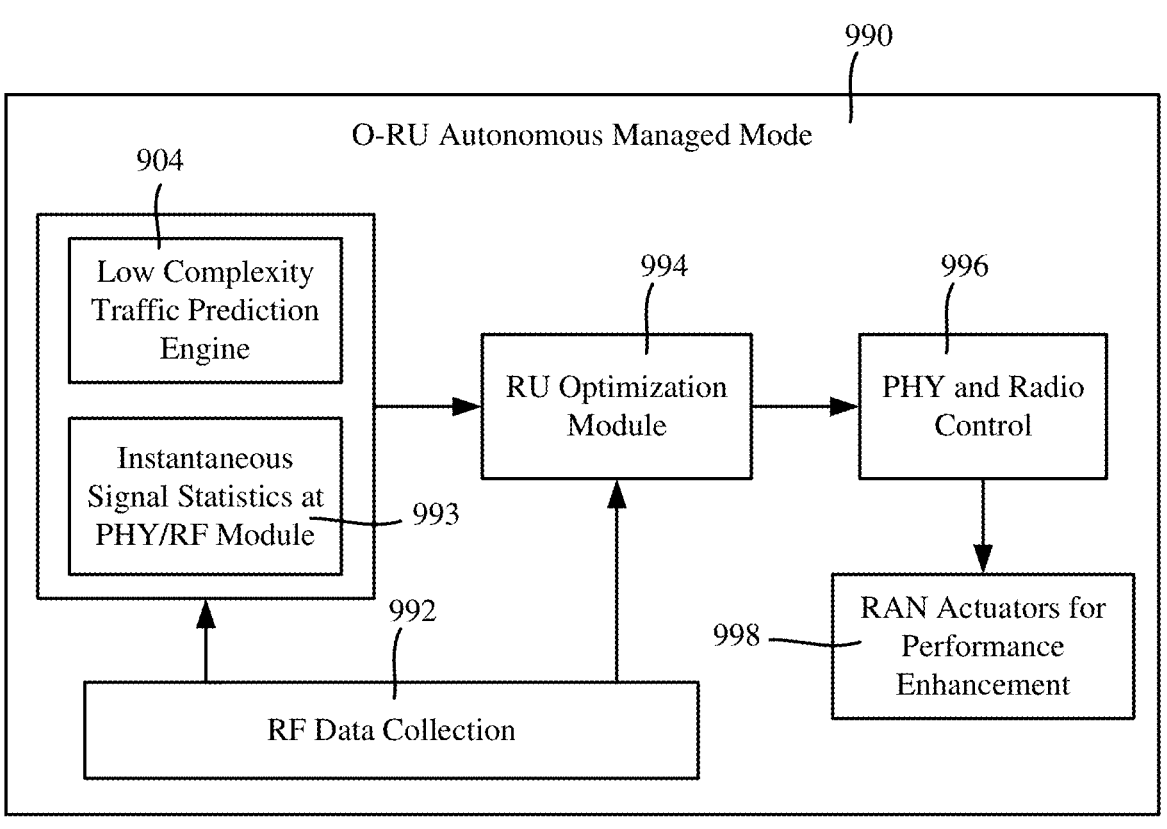
FIG. 9 is a block diagram showing an example of a radio unit operating in an autonomous managed mode for radio unit performance optimization, in accordance with various embodiments and implementations of the subject disclosure.

FIG. 9 shows another example of the technology described herein, generally directed towards real time-radio performance management based on a low-complexity traffic prediction engine 904. An autonomous mode for radio management operation is shown in FIG. 9 for a fifth generation (5G) open radio access network (O-RAN) radio unit (RU) labeled as O-RU autonomous managed mode (block 990). In general, the radio frequency (RF) layer has built-in telemetry aspects that collect data (block 992) at the RF level for signal statistics 993, as well other metrics related to radio health that via an RU optimization module 994, inform the radio unit controller (block 996) if the O-RU is at an optimal performance level. The controller 996 can thereby control physical (PHY) layer and radio control RAN actuators (block 998) for performance enhancement. The radio unit thus ingests real time traffic data, which in this example is time-series resource (PRB) usage instead of historical call record-based data (although both such types of time-series data can be used in training the low-complexity traffic prediction engine 904 deployed in the radio unit).

The RU optimization module 994 dictates the actions that radio unit is to take with respect to maintaining its functional capacity while minimizing power consumption, for example. However, in order to do so in an effective way, proactive action initiation by the RU optimization module 994 is needed that is able to adaptively adjust to the current traffic demand. The PRB occupation level and bandwidth are already known, e.g., for the last five minutes or other short timeframe, whereby only a predicted traffic level is needed to act on such current information. By implementing a low-complexity traffic prediction engine 904 as described herein on the radio unit platform itself, such proactive optimization measures can be taken by the radio unit in a straightforward manner.

For example, the RF data collection can get the PRBs for subframes, collected over time, resulting in the "instantaneous" (current) statistics 993 at the physical layer RF module 993. For example, for a radio unit put into a self-managed, self-optimized autonomous mode, the radio unit can decide its own optimum power consumption level, subject to provisioning enough resources for throughput that satisfies user traffic requirements. Although at present a radio unit can only recommend a desired operational power level corresponding to power consumption to the distributed unit (DU) to which the radio unit is coupled, and wait for the DU to act on its recommendation, the DU can potentially receive and act on such recommendations in a much faster timeframe than presently used, e.g., on the order of every few minutes instead of the half-hour to hours of time taken today, during which traffic levels can greatly fluctuate, because of the slower predictions made at the distributed unit/centralized unit levels. Note that while faster neural network predictions can be made by reducing the neural network size, this could reduce prediction accuracy and thus is not a good tradeoff.

Figure 10:
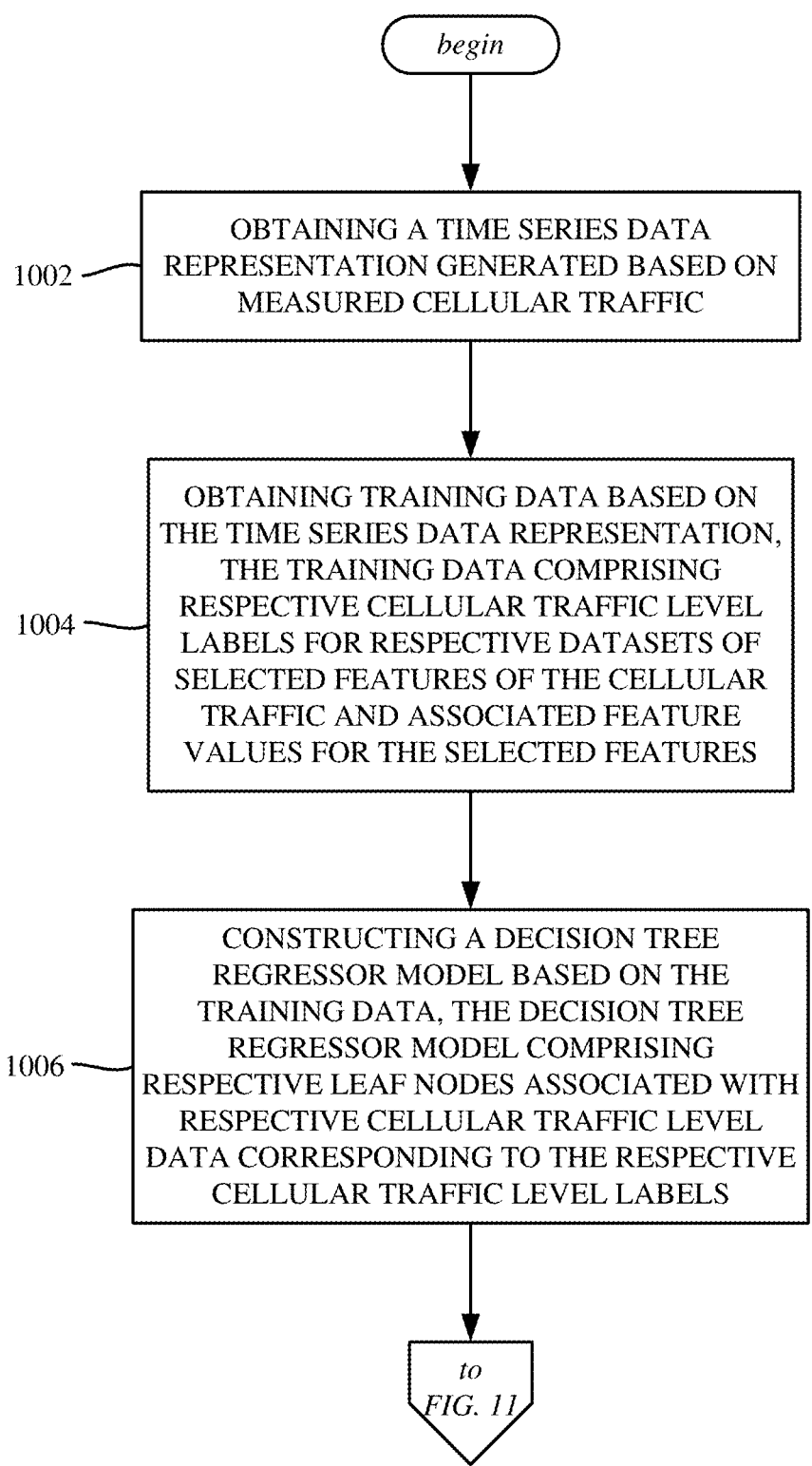

One or more concepts described herein can be embodied in a system, such as represented in the example operations of FIGS. 10 and 11, and for example can include a memory that stores computer executable components and/or operations, and at least one processor that executes computer executable components and/or operations stored in the memory. Example operations can include operation 1002, which represents obtaining a time series data representation generated based on measured cellular traffic. Example operation 1004 represents obtaining training data based on the time series data representation, the training data comprising respective cellular traffic level labels for respective datasets of selected features of the cellular traffic and associated feature values for the selected features. Example operation 1006 represents constructing a decision tree regressor model based on the training data, the decision tree regressor model comprising respective leaf nodes associated with respective cellular traffic level data corresponding to the respective cellular traffic level labels. The operations continue at FIG. 11, where example operation 1102 represents obtaining an independent data point comprising an input dataset of feature values, corresponding to the selected features, for which cellular traffic level is to be predicted. Example operation 1104 represents predicting cellular traffic level based on the independent data point; example operation 1104 can include operations 1106, 1108 and 1110. Example operation 1106 represents inputting the input dataset into the decision tree regressor model to traverse the decision tree regressor model based on the input dataset until reaching a matching leaf node of the respective leaf nodes. Example operation 1108 represents obtaining, from the matching leaf node, cellular traffic levels that corresponds to a predicted cellular traffic. Example operation 1110 represents determining the predicted cellular traffic level based on the cellular traffic level data from the matching leaf node.

The time series data representation corresponds to respective available candidate features, and wherein the operations further comprise determining respective statistical significance values for the respective available candidate features, and filtering based on the statistical significance values to determine the respective datasets of the selected features.

Determining the respective statistical significance values can include performing hypothesis testing to determine respective probability values, as the respective statistical significance values for the respective available candidate features, and filtering based on the respective statistical significance values can include determining which of the respective available candidate features satisfies a statistical significance threshold value.

The respective available candidate features can be based on a day of week name, day of month, hour of day, and minute of hour of day obtained from the time series data representation.

Further operations can include one-hot encoding the day of week name into seven encoded feature values, and wherein the respective available candidate features comprise the day of month, the hour of the day, the minute of the hour of the day, and the seven encoded feature values.

The statistical time series data can correspond to radio frequency signal statistics which can include physical resource block usage data collected for a radio unit over a defined timeframe.

The cellular traffic level from the matching leaf node can include multiple cellular traffic level values, and determining the predicted cellular traffic level can include determining the median of the multiple cellular traffic level values, or determining the mean of the multiple cellular traffic level values.

The time series data representation can correspond to the cellular traffic of a base station, and the decision tree regressor model can be constructed for the base station.

The time series data representation of the cellular traffic can correspond to first cellular traffic of a base station and second cellular traffic of at least one neighbor base station, and the decision tree regressor model can be constructed for the base station.

The time series data representation can include respective time series data representation of respective cellular traffic corresponding to respective base stations, the predicted cellular traffic level can include respective predicted traffic level values for the respective base stations, and further operations can include allocating base station resources among the respective base stations based on the respective predicted traffic level values.

Constructing the decision tree regressor model can include recursively building respective branches of the decision tree regressor model; the recursively building of at least some of the respective branches can occur in parallel.

The branches can include respective branches terminating at respective leaf nodes, and further operations can include pruning at least one branch of the respective branches.

Further operations can include assessing performance of the decision tree regressor model based on test data and evaluation metrics data.

Figure 12:
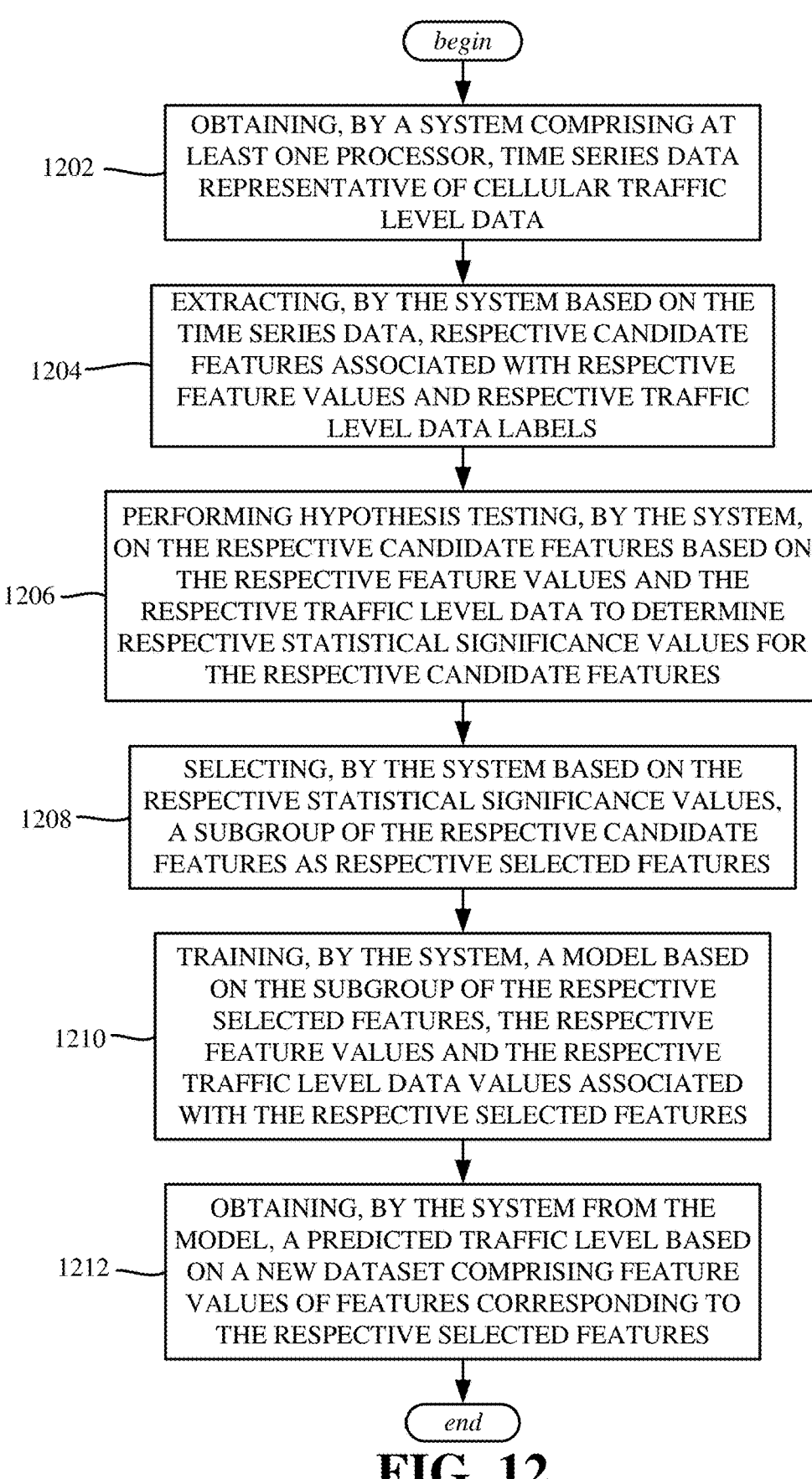
FIG. 12 is a flow diagram showing example operations related to obtaining a predicted cellular traffic level from a model trained with feature data of features selected via hypothesis testing, in accordance with various embodiments and implementations of the subject disclosure.

One or more example embodiments, such as corresponding to example operations of a method, are represented in FIG. 12. Example operation 1202 represents obtaining, by a system comprising at least one processor, time series data representative of cellular traffic level data. Example operation 1204 represents extracting, by the system based on the time series data, respective candidate features associated with respective feature values and respective traffic level data labels. Example operation 1206 represents performing hypothesis testing, by the system, on the respective candidate features based on the respective feature values and the respective traffic level data to determine respective statistical significance values for the respective candidate features. Example operation 1208 represents selecting, by the system based on the respective statistical significance values, a subgroup of the respective candidate features as respective selected features. Example operation 1210 represents training, by the system, a model based on the subgroup of the respective selected features, the respective feature values and the respective traffic level data values associated with the respective selected features. Example operation 1212 represents obtaining, by the system from the model, a predicted traffic level based on a new dataset comprising feature values of features corresponding to the respective selected features.

Training of the model can include training a decision tree regressor model.

Obtaining the statistical time series data can include obtaining radio frequency signal statistics representative of current traffic for a radio unit collected over a defined timeframe, wherein the training of the model comprises training a decision tree regressor model, and further comprising, adapting, by the system, power usage of the radio unit based on the predicted traffic level.

FIG. 13 summarizes various example operations, e.g., corresponding to a machine-readable medium, comprising executable instructions that, when executed by at least one processor, facilitate performance of operations. Example operation 1302 represents performing hypothesis testing on respective candidate features, based on time-series data representative of cellular traffic level data collected over a time range, to determine respective selected features that satisfy a statistical significance threshold value. Example operation 1304 represents constructing a decision tree regressor model based on the respective selected features and respective datasets of the selected features, the respective datasets comprising respective feature values and respective traffic level data labels. Example operation 1306 represents obtaining a predicted future traffic level data value based on inputting a new dataset of respective feature values into the decision tree regressor model.

Further operations can include at least one of: collecting the time-series data based on physical resource usage of a radio unit of a base station, or obtaining the time-series data based on call data records associated with the base station.

The time-series data can be associated with a base station, and performing the hypothesis testing further can include performing the hypothesis testing on respective candidate spatiotemporal features based on correlated spatiotemporal data of at least one neighboring base station to determine at least one of the respective selected features.

The base station can be a first base station, wherein the predicted future traffic level data value can be a first predicted future traffic level data, and further operations can include obtaining a second predicted future traffic level data value for a second base station, and allocating resources to the first base station and to the second base station based on the first predicted future traffic level data value and the second predicted future traffic level data value.

As can be seen, the technology described herein facilitates an accurate low-complexity traffic predictor based on a decision tree regressor model that is fast to train to efficiently output predicted cellular traffic level data. The low-complexity traffic predictor can use a longer memory impact for prediction, via a supervised machine learning architecture that can be used for multi-step prediction while reducing the impact of outlier measurements and or missing data through p-value based screening. The cellular traffic prediction engine described herein can be augmented to incorporate spatial correlation information. The predictor architecture is computationally much cheaper than other tree-based architectures, and can be deployed on the low-power hardware of a radio unit, including for real time radio unit performance enhancement.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
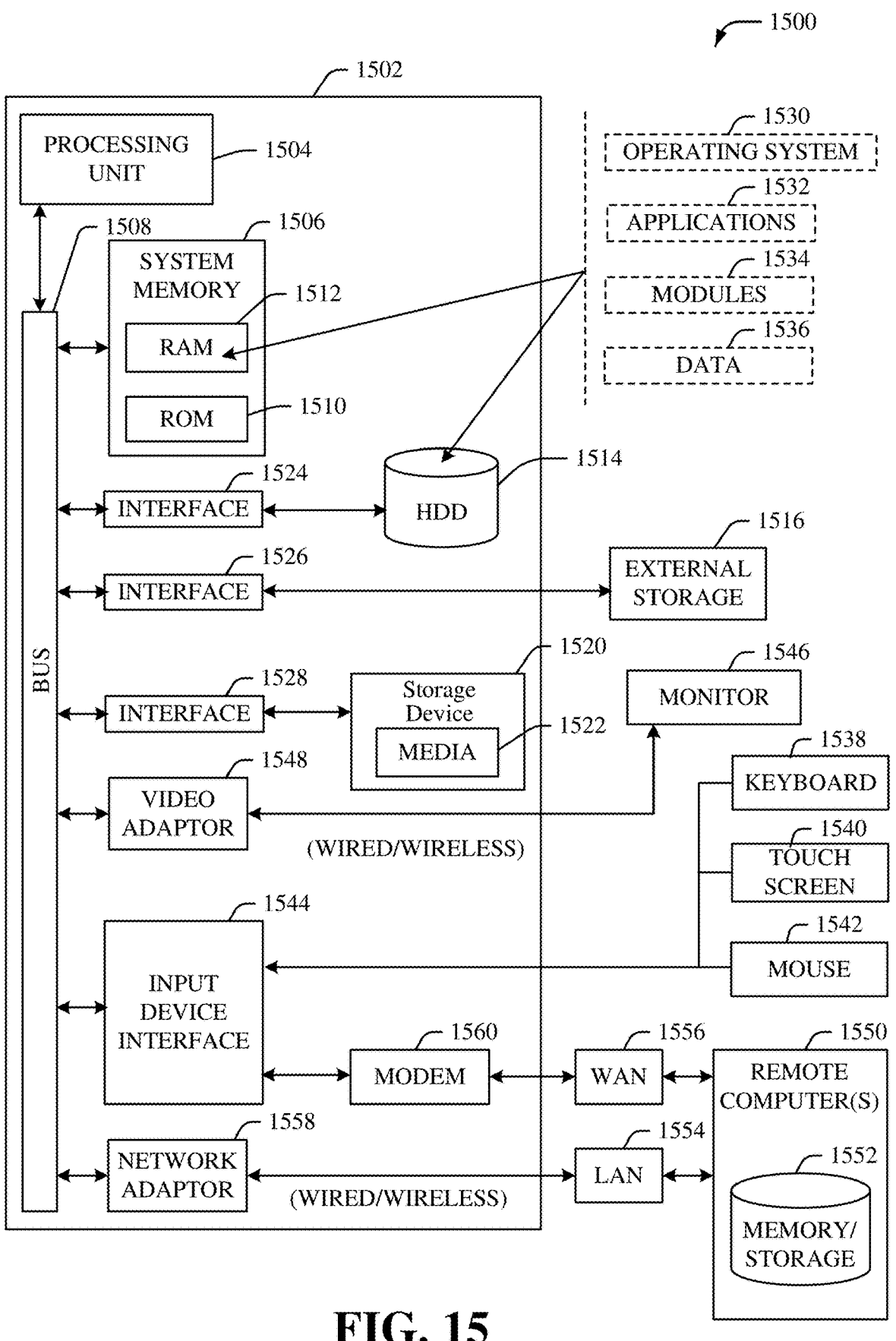
FIG. 15 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (virtual machine) of multiple virtual machines hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1594 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining a time series data representation generated based on measured cellular traffic associated with a first base station;

generating training data based on the time series data representation associated with the first base station and spatiotemporal data associated with a second base station, the training data comprising respective cellular traffic level labels for respective datasets of selected features of the cellular traffic and associated feature values for the selected features, wherein the time series data representation corresponds to respective first available candidate features, wherein the spatiotemporal data corresponds to respective second available candidate features, and wherein the generating of the training data comprises performing hypothesis testing on the respective first available candidate features and the respective second available candidate features to determine respective probability values as respective statistical significance values associated with the respective first available candidate features and the respective second available candidate features, and determining whether and which of the respective statistical significance values satisfy a defined threshold statistical significance value to determine whether and which of the respective first available candidate features and the respective second available candidate features are to be selected to be included as part of the training data;

constructing a decision tree regressor model based on the training data, the decision tree regressor model comprising respective leaf nodes associated with respective cellular traffic level data corresponding to the respective cellular traffic level labels;

obtaining an independent data point comprising an input dataset of feature values, corresponding to the selected features, for which cellular traffic level is to be predicted; and predicting cellular traffic level based on the independent data point, comprising, inputting the input dataset into the decision tree regressor model to traverse the decision tree regressor model based on the input dataset until reaching a matching leaf node of the respective leaf nodes, obtaining, from the matching leaf node, cellular traffic levels that corresponds to a predicted cellular traffic, and determining the predicted cellular traffic level based on the cellular traffic level data from the matching leaf node.

2. The system of claim 1, wherein the time series data representation corresponds to the respective first available candidate features, and wherein the operations further comprise determining the respective statistical significance values for the respective first available candidate features and the respective second available candidate features, and filtering based on the respective statistical significance values to determine the respective datasets of the selected features.

3. The system of claim 2, wherein the determining of the respective statistical significance values comprises the performing of the hypothesis testing to determine the respective probability values, as the respective statistical significance values for the respective first available candidate features and the respective second available candidate features, and wherein the filtering based on the respective statistical significance values comprises determining which of the respective first available candidate features and the respective second available candidate features satisfy the defined threshold statistical significance value.

4. The system of claim 2, wherein the respective available candidate features are based on a day of week name, a day of month, an hour of day, and a minute of hour of day obtained from the time series data representation.

5. The system of claim 4, wherein the operations further comprise one-hot encoding the day of week name into seven encoded feature values, and wherein the respective first available candidate features comprise the day of month, the hour of the day, the minute of the hour of the day, and the seven encoded feature values.

6. The system of claim 1, wherein the time series data representation corresponds to radio frequency signal statistics comprising physical resource block usage data collected for a radio unit over a defined timeframe.

7. The system of claim 1, wherein the cellular traffic level from the matching leaf node comprises multiple cellular traffic level values, and wherein the determining of the predicted cellular traffic level comprises determining a median of the multiple cellular traffic level values, or determining a mean of the multiple cellular traffic level values.

8. The system of claim 1, wherein the time series data representation corresponds to the cellular traffic of the first base station, and wherein the decision tree regressor model is constructed for the first base station.

9. The system of claim 1, wherein the time series data representation representative of the cellular traffic corresponds to first cellular traffic of the first base station and second cellular traffic of at least one neighbor base station, comprising the second base station, and wherein the decision tree regressor model is constructed for at least one of the first base station or the second base station.

10. The system of claim 1, wherein the time series data representation comprises respective time series data representation of respective cellular traffic corresponding to respective base stations, wherein the predicted cellular traffic level comprises respective predicted traffic level values for the respective base stations, wherein the operations further comprise allocating base station resources among the respective base stations based on the respective predicted traffic level values, and wherein the respective base stations comprise the first base station and the second base station.

11. The system of claim 1, wherein the constructing of the decision tree regressor model comprises recursively building respective branches of the decision tree regressor model, and wherein the recursively building of at least some of the respective branches occurs in parallel.

12. The system of claim 11, wherein the branches comprise respective branches terminating at respective leaf nodes, and wherein the operations further comprise pruning at least one branch of the respective branches.

13. The system of claim 1, wherein the operations further comprise assessing performance of the decision tree regressor model based on test data and evaluation metrics data.

14. A method, comprising:

obtaining, by a system comprising at least one processor, time series data representative of first cellular traffic level data associated with a first base station;

based on the time series data, extracting, by the system, respective first candidate features associated with respective first feature values and respective traffic level data labels;

based on spatiotemporal data representative of second cellular traffic level data associated with a second base station, extracting, by the system, respective second candidate features associated with respective second feature values;

performing, by the system, hypothesis testing on the respective first candidate features and the respective second candidate features based on the respective first feature values and the respective second feature values to determine respective statistical significance values for the respective first candidate features and the respective second candidate features;

based on the respective statistical significance values and a threshold statistical significance value, selecting, by the system, some of the respective first candidate features and some of the respective second candidate features as respective selected features;

training, by the system, a model based on the respective selected features, the respective first feature values and the respective second feature values associated with the respective selected features, and the respective traffic level data labels associated with the respective selected features; and determining, by the system using the model, a predicted traffic level associated with the first base station based on a subsequent dataset comprising subsequent feature values of features corresponding to the respective selected features.

15. The method of claim 14, wherein the training of the model comprises training a decision tree regressor model.

16. The method of claim 14, wherein the obtaining of the time series data comprises obtaining radio frequency signal statistics representative of traffic for a radio unit of the first base station that is collected over a defined timeframe, wherein the training of the model comprises training a decision tree regressor model, and wherein the method further comprises: adapting, by the system, power usage of the radio unit based on the predicted traffic level.

17. A non-transitory machine-readable medium, comprising executable instructions that, when executed by at least one processor, facilitate performance of operations, the operations comprising:

performing hypothesis testing on respective candidate features, based on time-series data representative of first cellular traffic level data associated with a first base station and collected over a time range, and based on spatiotemporal data representative of second cellular traffic level data associated with a second base station, to determine, from the respective candidate features, respective selected features that satisfy a threshold statistical significance value;

constructing a decision tree regressor model based on the respective selected features and respective datasets of the selected features, the respective datasets comprising respective feature values and respective traffic level data labels; and determining a predicted future traffic level data value associated with the first base station based on a result of an analysis, using the decision tree regressor model, of a subsequent dataset, comprising respective subsequent feature values, input into the decision tree regressor model.

18. The non-transitory machine-readable medium of claim 17, wherein the operations further comprise at least one of: collecting the time-series data based on physical resource usage of a radio unit of the first base station, or obtaining the time-series data based on call data records associated with the first base station.

19. The non-transitory machine-readable medium of claim 17, wherein the performing of the hypothesis testing further comprises performing the hypothesis testing on respective candidate spatiotemporal features based on correlated spatiotemporal data of neighboring base stations, comprising the second base station, to determine at least one of the respective selected features, wherein the neighboring base stations are within a same geographic coordinate area as the first base station, wherein some of the respective candidate features are the respective candidate spatiotemporal features, and wherein the correlated spatiotemporal data comprises the spatiotemporal data.

20. The non-transitory machine-readable medium of claim 17, wherein the predicted future traffic level data value is a first predicted future traffic level data, and wherein the operations further comprise determining a second predicted future traffic level data value for the second base station, and allocating resources to the first base station and the second base station based on the first predicted future traffic level data value and the second predicted future traffic level data value.

* * * * *